United States Patent [19]

Shaw et al.

[11] Patent Number: 5,513,707

[45] Date of Patent: May 7, 1996

[54] PROCESS FOR CHEMICALLY TREATING RESERVOIR PYROBITUMEN TO IMPROVE PERMEABILITY

[75] Inventors: Jerry C. Shaw; Raymond Tsuen; Conrad Ayasse, all of Calgary, Canada

[73] Assignee: Petroleum Recovery Institute, Calgary, Canada

[21] Appl. No.: 311,761

[22] Filed: Sep. 23, 1994

[30] Foreign Application Priority Data

Sep. 23, 1993 [GB] United Kingdom .................. 9319696

[51] Int. Cl.$^6$ ........................... E21B 43/24; E21B 43/25
[52] U.S. Cl. ...................... 166/303; 166/302; 166/305.1; 166/312
[58] Field of Search .................................... 166/302, 303, 166/304, 305.1, 307, 312; 507/277

[56] References Cited

U.S. PATENT DOCUMENTS

| | | | |
|---|---|---|---|
| 3,122,503 | 2/1964 | Katzer | 166/312 X |
| 3,482,636 | 12/1969 | Crowe | 166/307 |
| 3,648,774 | 3/1972 | Kirk | 166/305.1 |
| 4,068,716 | 1/1978 | Allen | 166/272 X |
| 4,569,393 | 2/1986 | Bruning et al. | 166/270 |
| 5,103,914 | 4/1992 | LaHaye | 166/312 X |

*Primary Examiner*—George A. Suchfield
*Attorney, Agent, or Firm*—Millen, White, Zelano, & Branigan

[57] ABSTRACT

The process involves a well stimulation treatment of a hydrocarbon reservoir containing solid pyrobitumen. A strong oxidant, preferably sodium hypochlorite, is injected into the reservoir as an aqueous solution containing 5 wt. % or higher concentration of the oxidant. The oxidant is retained in contact with the formation for a predetermined retention period and the well is then backflowed or pumped to remove oxidation products. The permeability of the reservoir is improved, apparently by conversion of the solid pyrobitumen to removable gaseous and liquid products.

4 Claims, No Drawings

PROCESS FOR CHEMICALLY TREATING RESERVOIR PYROBITUMEN TO IMPROVE PERMEABILITY

FIELD OF THE INVENTION

This invention relates to a process for improving the permeability of a subterranean hydrocarbon reservoir containing solid pyrobitumen, by injecting a strong oxidant into the reservoir to react with the pyrobitumen and convert some of it to liquid and gas products.

BACKGROUND OF THE INVENTION

Pyrobitumen is a solid, black, bituminous material which is found in significant quantities in certain subterranean, hydrocarbon-containing reservoirs.

The reservoirs are carbonate reservoirs and some sandstone reservoirs.

The reservoirs which we have examined typically contain between 0.1 wt. % and 10 wt. % pyrobitumen.

The pyrobitumen is typically present as a filling or lining within vugular and intercrystalline pore networks and fractures. It is generally accepted that pyrobitumen was formed in-situ by either thermal alteration of oil or deasphalting of heavy oil.

The pyrobitumen is an impediment to hydrocarbon productivity because of its oil-wetness, porosity occlusion and permeability reduction characteristics.

It is the objective of the present invention to improve the effective permeability of the reservoir rock and enhance the producibility of a well completed in the reservoir, by removing pyrobitumen.

SUMMARY OF THE INVENTION

The invention is based on the experimental discovery that a strong oxidant, specifically sodium hypochlorite, will react with solid pyrobitumen at elevated temperature to convert the latter in part to gaseous and liquid products. When tested in a core of reservoir rock, it was found that flushing the core with an aqueous solution of the sodium hypochlorite was accompanied by a significant improvement in the permeability of the core.

Broadly stated, the invention that has been developed is a process for treating a subterranean hydrocarbon reservoir containing pyrobitumen (preferably present in amount between 0.1–10 wt. %), the reservoir preferably having a temperature greater than about 50° C., comprising:

injecting a solution, preferably aqueous, containing an oxidant selected from the group consisting of alkali hypohalites and alkaline earth hypohalites (preferably sodium hypochlorite), through a well into the reservoir;

the concentration of the oxidant in the solution preferably being greater than about 5 wt. %, most preferably being between 10–18 wt. %;

temporarily closing in the well to allow the oxidation reaction to proceed; and then producing the well.

DESCRIPTION OF THE PREFERRED EMBODIMENT

The subterranean reservoir contains producible hydrocarbons and further contains 0.1 to 10 wt. % pyrobitumen. Typically, the reservoir is formed of a porous, permeable carbonate or sandstone rock.

The reservoir preferably has an elevated temperature greater than 50° C. If the temperature is less than 50° C., it may be necessary to preheat the solution to achieve the desired oxidation reaction rate in situ.

The solution is aqueous.

The oxidant is sodium hypochlorite supplied in the solution at a concentration of at least 5 wt. %, preferably 10–18 wt. %.

The retention time is selected having consideration to the reservoir temperature and the oxidant concentration. Each of these variables should be sufficient to ensure that some of the pyrobitumen is oxidized to a removable form.

In a field operation, the solution is injected into the reservoir through a well completed in it. The well is then closed in, to allow the oxidant to react with the pyrobitumen. And finally, the well is again opened to produce.

The invention is supported by the following examples.

EXAMPLE I

An aqueous solution containing 16 wt. % hydrogen peroxide was added to a sample of pyrobitumen. The conditions and results are set forth in Table I:

TABLE I

| Laboratory Results of Using 16% Hydrogen Peroxide* at 97° C. to Oxidize a Pyrobitumen Sample Initial weight of Pyrobitumen Sample = 0.1142 g | |
| --- | --- |
| Time (hr) | Weight of Pyrobitumen (g) |
| 0.00 | 0.1142 |
| 12.50 | 0.0281 |

Note:
*60 cc of hydrogen peroxide was used.

Due to chemical instability, slow reactivity of the hydrogen peroxide and the relatively large amount of pyrobitumen residue, the treatment was deemed to be unsuccessful for a well stimulation.

EXAMPLE II

An aqueous solution containing 5 wt. % sodium hypochlorite was added to a sample of pyrobitumen. The conditions and results are set forth in Table II:

TABLE II

| Laboratory Results of Using 5% NaOCl* Solution at 97° C. to Oxidize a Pyrobitumen Sample Initial Weight of Pyrobitumen Sample = 0.1027 g | |
| --- | --- |
| Time (hr) | Weight of Pyrobitumen (g) |
| 0.00 | 0.1027 |
| 5.20 | not measurable** |

Note:
*60 cc of sodium hypochlorite was used.
**The oxidation process was complete and the residue left was not measurable.

The results indicated that the sodium hypochlorite would successfully and completely decompose pyrobitumen at 97° C. in a reasonable period of time. The treatment was deemed acceptable for a well stimulation.

EXAMPLE III

An aqueous solution containing 11 wt. % sodium hypochlorite was added to a sample of pyrobitumen. The conditions and results are set forth in Table III:

TABLE III

Laboratory Results of Using 11% NaOCl* solution at 97° C. to Oxidize a Pyrobitumen Sample
Initial Weight of Pyrobitumen Sample = 0.1215 g

| Time (hr) | Weight of Pyrobitumen (g) |
|---|---|
| 0.00 | 0.1215 |
| 2.50 | not measurable** |

Note:
*60 cc of sodium hypochlorite was used.
**The oxidation process was complete and the residue left was not measurable.

The results indicated that a stronger concentration of oxidant accelerated the reaction to a significant extent. The treatment was deemed acceptable for a well stimulation.

EXAMPLE IV

An aqueous solution containing 11 wt. % sodium hypochlorite was added to a sample of pyrobitumen. The conditions and results are set forth in Table IV:

TABLE IV

Laboratory Results of Using 11% NaOCl solution* at 50° C. to Oxidize a Pyrobitumen Sample
Initial Weight of Pyrobitumen Sample = 0.1208 g

| Time (hr) | Weight of Pyrobitumen (g) |
|---|---|
| 0.00 | 0.1208 |
| 40.00 | not measurable** |

Note:
*60 cc of sodium hypochlorite was used.
**The oxidation process was complete and the residue left was not measurable.

The results indicated that, at a temperature of 50° C., the pyrobitumen was completely decomposed, but only after 40 hours in contact with the oxidant. This was deemed to be acceptable for a well stimulation, but just barely so.

EXAMPLE V

A pair of laboratory coreflood runs were conducted, one at 60° C. and the other at 90° C.

The core was from a carbonate reservoir containing pyrobitumen.

The core was contained in a tri-axially loaded, conventional core holder having inlet and outlet ends and made of Hastelloy C. An overburden pressure of 3700 psi was applied and a backpressure of 2000 psi was maintained at the outlet. The core and holder were heated to 60° C. in an oven. 78 cc's of brine solution containing 1 wt. % NaCl were injected at the inlet at 50 cc/hr. to determine initial liquid permeability. 137 cc's of aqueous solution containing 14 wt. % NaOCl were injected at the inlet at 50 cc/hr. to oxidize the pyrobitumen in the core. The final liquid permeability was determined by injecting the brine solution. The core permeability was increased by 31 fold, as set forth in Table V. Comparable results (40 fold increase in permeability) were obtained at 90° C. using similar laboratory procedures as shown in Table V.

TABLE V

Coreflood Results of Using 14% NaOCl solution at 60° C. and 90° C.
Overburden Pressure = 3700 psig Backpressure = 2000 psig

| | 60° | | | | 90° | | |
|---|---|---|---|---|---|---|---|
| Fluid | Rate (cc/hr) | Volume Injected (cc) | Permeability (md) | Fluid | Rate (cc/hr) | Volume Injected (cc) | Permeability (md) |
| Brine | 50 | 77.94 | 4.4 | Brine | 50 | 56.72 | 4.2 |
| Bleach | 50 | 137.38 | 15.9 | Bleach | 50 | 195.03 | 4.3 |
| Brine | 50 | 79.26 | 135.8 | Brine | 50 | 72.26 | 162.6 |

Visual and microscopic examination of the core samples before and after the treatment showed that pyrobitumen was initially present at the beginning of the test and it had been removed by the end of the test.

The embodiments of the invention in which an exclusive property or privilege is claimed are defined as follows:

1. A process for treating a subterranean hydrocarbon reservoir containing pyrobitumen, said reservoir being penetrated by and in producing communication with a well, comprising:

injecting a solution, containing an oxidant selected from the group consisting of alkali hypohalites and alkaline earth hypohalites, through the well into the reservoir;

temporarily retaining the solution in contact with the reservoir for a predetermined period of time; and producing the well;

the concentration of the oxidant, the temperature of the solution or reservoir and the retention time each being sufficient to ensure that at least part of the pyrobitumen is removed with a corresponding increase in well productivity.

2. The process as set forth in claim 1 wherein:

the reservoir contains between 0.1 and 10 percent by weight pyrobitumen;

the oxidant is selected from the group consisting of calcium and sodium hypohalites;

the concentration of the oxidant is greater than 5 percent by weight; and the reservoir temperature is greater than about 50° C.

3. The process as set forth in claim 2 wherein:
the oxidant is sodium hypohalite.

4. The process as set forth in claim 1 wherein:
the oxidant is sodium hypochlorite;
the solution is aqueous;
the concentration of the oxidant is between 10 and 18 percent by weight; and
the reservoir temperature is greater than about 50° C.

* * * * *